United States Patent
Seki et al.

(10) Patent No.: US 11,791,691 B2
(45) Date of Patent: Oct. 17, 2023

(54) GENERATOR COOLING SYSTEM FOR TURBO-FAN ENGINE

(71) Applicant: IHI CORPORATION, Tokyo (JP)

(72) Inventors: Naoki Seki, Tokyo (JP); Toshikazu Kobayashi, Tokyo (JP); Shotaro Ishii, Tokyo (JP)

(73) Assignee: IHI CORPORATION, Tokyo (JP)

( * ) Notice: Subject to any disclaimer, the term of this patent is extended or adjusted under 35 U.S.C. 154(b) by 123 days.

(21) Appl. No.: 17/451,860

(22) Filed: Oct. 22, 2021

(65) Prior Publication Data
US 2022/0045573 A1 Feb. 10, 2022

Related U.S. Application Data

(63) Continuation of application No. PCT/JP2020/006463, filed on Feb. 19, 2020.

(30) Foreign Application Priority Data

Jul. 24, 2019 (JP) .................. 2019-136075

(51) Int. Cl.
*H02K 5/20* (2006.01)
*H02K 7/18* (2006.01)

(52) U.S. Cl.
CPC ....... *H02K 7/1823* (2013.01); *F05D 2220/76* (2013.01)

(58) Field of Classification Search
CPC ... H02K 7/1823; H02K 5/225; F05D 2220/76
See application file for complete search history.

(56) References Cited

U.S. PATENT DOCUMENTS

| 9,003,811 B2 | 4/2015 | Barnett et al. |
| 2006/0138779 A1 | 6/2006 | Bouiller et al. |

(Continued)

FOREIGN PATENT DOCUMENTS

| JP | 2006-153013 A | 6/2006 |
| JP | 2009-510304 A | 3/2009 |

(Continued)

OTHER PUBLICATIONS

International Search Report dated Apr. 21, 2020 in PCT/JP2020/006463 filed on Feb. 19, 2020, 3 pages.

(Continued)

*Primary Examiner* — Sean Gugger
(74) *Attorney, Agent, or Firm* — Oblon, McClelland, Maier & Neustadt, L.L.P.

(57) ABSTRACT

A system capable of appropriately cooling a generator and a power cable connected to the generator, disposed in a hot section of a turbo-fan engine, regardless of a rating of the engine is provided. The system includes: a junction box; a bypass air duct that supplies, to the junction box, air extracted from a portion of a bypass flow path of the engine on a side further downstream than a fan outlet; a core air duct that supplies, to the junction box, air extracted from a portion of a core flow path of the engine on a side further upstream than a compressor outlet; and a cooling air duct that extends from the junction box to a space for accommodating the generator, and valves capable of being independently controlled to open and close are provided at downstream ends of the bypass air duct and the core air duct.

4 Claims, 3 Drawing Sheets

(56) References Cited

U.S. PATENT DOCUMENTS

| | | |
|---|---|---|
| 2008/0230651 A1 | 9/2008 | Porte |
| 2009/0297342 A1 | 12/2009 | Laborie |
| 2013/0133336 A1 | 5/2013 | Barnett et al. |
| 2013/0192253 A1 | 8/2013 | Ackermann et al. |
| 2015/0232188 A1 | 8/2015 | Tateiwa |
| 2015/0252683 A1 | 9/2015 | Hasting et al. |
| 2016/0131036 A1 | 5/2016 | Bintz et al. |
| 2016/0153359 A1 | 6/2016 | Leamy et al. |
| 2016/0319748 A1 | 11/2016 | Miller et al. |
| 2017/0009657 A1 | 1/2017 | Schwarz et al. |
| 2017/0051678 A1 | 2/2017 | Becker, Jr. |
| 2017/0051679 A1 | 2/2017 | Becker, Jr. |
| 2017/0051680 A1 | 2/2017 | Becker, Jr. et al. |
| 2017/0234224 A1 | 8/2017 | Adibhatla |
| 2018/0016933 A1 | 1/2018 | Elbibary et al. |
| 2018/0051702 A1 | 2/2018 | Kupiszewski et al. |
| 2018/0134407 A1 | 5/2018 | Elbibary et al. |
| 2022/0128004 A1* | 4/2022 | Muldoon ............ H05K 7/20209 |
| 2022/0235671 A1* | 7/2022 | Rambo .................... F02K 3/06 |

FOREIGN PATENT DOCUMENTS

| | | |
|---|---|---|
| JP | 2013-127247 A | 6/2013 |
| JP | 2016-211552 A | 12/2016 |
| JP | 2017-040263 A | 2/2017 |
| JP | 2017-040264 A | 2/2017 |
| JP | 2017-040265 A | 2/2017 |
| JP | 2017-524092 A | 8/2017 |
| JP | 2017-524093 A | 8/2017 |
| JP | 2017-166476 A | 9/2017 |
| JP | 6317946 B2 | 4/2018 |

OTHER PUBLICATIONS

European Search Report issued in European Patent Application No. 20844627.8 dated Aug. 25, 2023.

\* cited by examiner

GENERATOR COOLING SYSTEM FOR TURBO-FAN ENGINE

TECHNICAL FIELD

Embodiments described herein relates to a system for cooling a generator and an electric power cable connected to the generator, the generator and the electric power cable being disposed in a hot section of a turbo-fan engine.

BACKGROUND ART

A turbo-fan engine is composed of a fan disposed at a frontmost portion and a core engine disposed coaxially with the fan behind the fan.

In a case of a two-spool turbo-fan engine, a core engine includes a low pressure compressor, a high pressure compressor, a combustor, a high pressure turbine, and a low pressure turbine in this order from a front portion (upstream) to a rear portion (downstream), a rotor of the high pressure turbine drives and rotates a rotor of the high pressure compressor via a high pressure shaft, and a rotor of the low pressure turbine drives and rotates rotors of the low pressure compressor and the fan via a low pressure shaft respectively. Both the high pressure and low pressure shafts (main shafts) are hollow shafts, and the low pressure shaft is disposed inside the high pressure shaft.

A part of air suctioned by the fan and then compressed during an operation of the turbo-fan engine flows into the core engine and contributes to generation of high-temperature and high-pressure gas for driving the low pressure turbine, which is a rotation drive source of the fan and the low pressure compressor, and a remaining part of the air bypasses the core engine, is then discharged from the rear side, and contributes to generation of a most part of a thrust.

Incidentally, a turbo-fan engine mounted on an aircraft includes a generator driven by power extracted from main shafts in order to supply electric power to electric and electronic devices mounted on the aircraft body in addition to an engine control device.

According to a turbo-fan engine in the related art, power is extracted from a high pressure shaft via a power take-off (PTO) shaft provided inside a front frame disposed at a front portion and is transmitted to a generator attached to an accessor gear box (AGB) disposed in the vicinity of the front frame (for example, outside a casing of a fan, inside a core cowl surrounding a core engine (outside a casing of a high pressure compressor), or the like) via the AGB.

However, there has been a trend that power demands of electric and electronic devices mounted on aircraft bodies of air crafts increase in recent years. This is because drive sources for actuators for operating control surfaces and landing gears have been changed from hydraulic pressures generated using power of engines (or auxiliary power units (APUs) mounted on the aircrafts) into electricity and sources for air conditioning in cabins have been changed from air extracted from engines to air generated by electric compressors, for the purpose of reducing environmental burdens, improving reliability, and the like.

Therefore, employing of a generator that is driven and rotated by power of a low pressure shaft in addition to a generator (as described above) that is driven and rotated by power of a high pressure shaft has been proposed for a turbo-fan engine in recent years in order to respond to increasing power demands (see Patent Document 1, for example).

In a turbo-fan engine (turbo-fan gas turbine engine (10)) disclosed in Patent Document 1, a generator (electric machine (32)) that is driven by a low pressure shaft (low pressure shaft (24)) via a coupling mechanism (coupling mechanism (44)) is disposed inside a tail cone (tail cone (30)) attached to a support structure (support structure (42)) such as a turbine exhaust case (see FIG. 2).

Here, the tail cone is located in a hot section (a combustor and a portion further downstream than the combustor) of the turbo-fan engine, and the inside of the tail cone is heated to a high temperature due to an influence of turbine exhaust (typically, about 600° C. at maximum) flowing in the surroundings. Therefore, the inside of the tail cone is required to be cooled in order to protect the generator disposed in the tail cone from damage due to overheating.

In the turbo-fan engine disclosed in Patent Document 1, the tail cone is provided with a cooling fluid inlet (cooling fluid inlet (46)) and a cooling fluid outlet (cooling fluid outlet (48)) such that the inside of the tail cone is cooled through circulation of a cooling fluid such as air.

Although Patent Document 1 does not include any mention regarding a supply source for air as the aforementioned cooling fluid, the supply source is to be a portion of a mainstream flow path (a flow path of air that is a working fluid) in the turbo-fan engine from which part air at a temperature that does not exceed an upper limit temperature (about 200° C., for example) for utilization of the generator can be extracted regardless of a rating of the engine. Examples of such a portion include a fan outlet (more strictly, a trailing edge of a fan exit guide vane).

RELATED ART DOCUMENT

Patent Document

Patent Document 1: U.S. Pat. No. 9,003,811

SUMMARY OF THE DISCLOSURE

Problems to be Solved by the Disclosure

However, air extracted from the fan outlet of the turbo-fan engine, though having a sufficiently low temperature as described above, has a low pressure in a case in which the rating of the engine is low (idle, for example), and a sufficient flow amount of air cannot be supplied due to a pressure loss in a supply path to the inside of the tail cone. On the other hand, turbine exhaust has a temperature exceeding the upper limit temperature for utilization of the generator even in a case in which the rating of the engine is low, and there is a concern that the generator may be overheated and damaged due to insufficient flow amount of the cooling air supplied to the inside of the tail cone.

Meanwhile, in a case in which the generator is disposed inside the tail cone, the electric power cable to supply electric power to an engine control device and electric and electronic devices mounted on the aircraft bodies is laid across a hot section of a turbo-fan engine, the electric power cable is thus heated from the outside, and generates a large amount of heat through feeding of a large current in response to an increase in power demands as described above. Although the electric power cable is required to be appropriately cooled for this reason, Patent Document 1 does not include any mention in this regard.

The present disclosure was made in view of the aforementioned circumstances, and an object of the present disclosure is to provide a system capable of appropriately cooling a generator and an electric power cable connected to the generator with the generator and the electric power cable being disposed in a hot section of a turbo-fan engine, regardless of a rating of an engine.

Means for Solving the Problems

In order to achieve the above object, an aspect of the present disclosure is directed to a system including: a junction box; a bypass air duct that supplies, to the junction box, air extracted from a portion of a bypass flow path of a turbo-fan engine on a side further downstream than a fan outlet; a core air duct that supplies, to the junction box, air extracted from a portion of a core flow path of the turbo-fan engine on a side further upstream than a compressor outlet; and a cooling air duct that extends from the junction box to a space in which the generator is accommodated and accommodates the electric power cable inside the cooling air duct, and valves that are able to be independently controlled to open and close are provided at downstream ends of the bypass air duct and the core air duct.

Effects of the Disclosure

According to the system of the present disclosure, an excellent advantage that it is possible to appropriately cool a generator and an electric power cable connected to the generator with the generator and the electric power cable being disposed in a hot section of a turbo-fan engine, regardless of a rating of an engine can be achieved.

MODE FOR CARRYING OUT THE DISCLOSURE

Hereinafter, an embodiment of the present disclosure will be described in detail with reference to the drawings.

Figure 1:
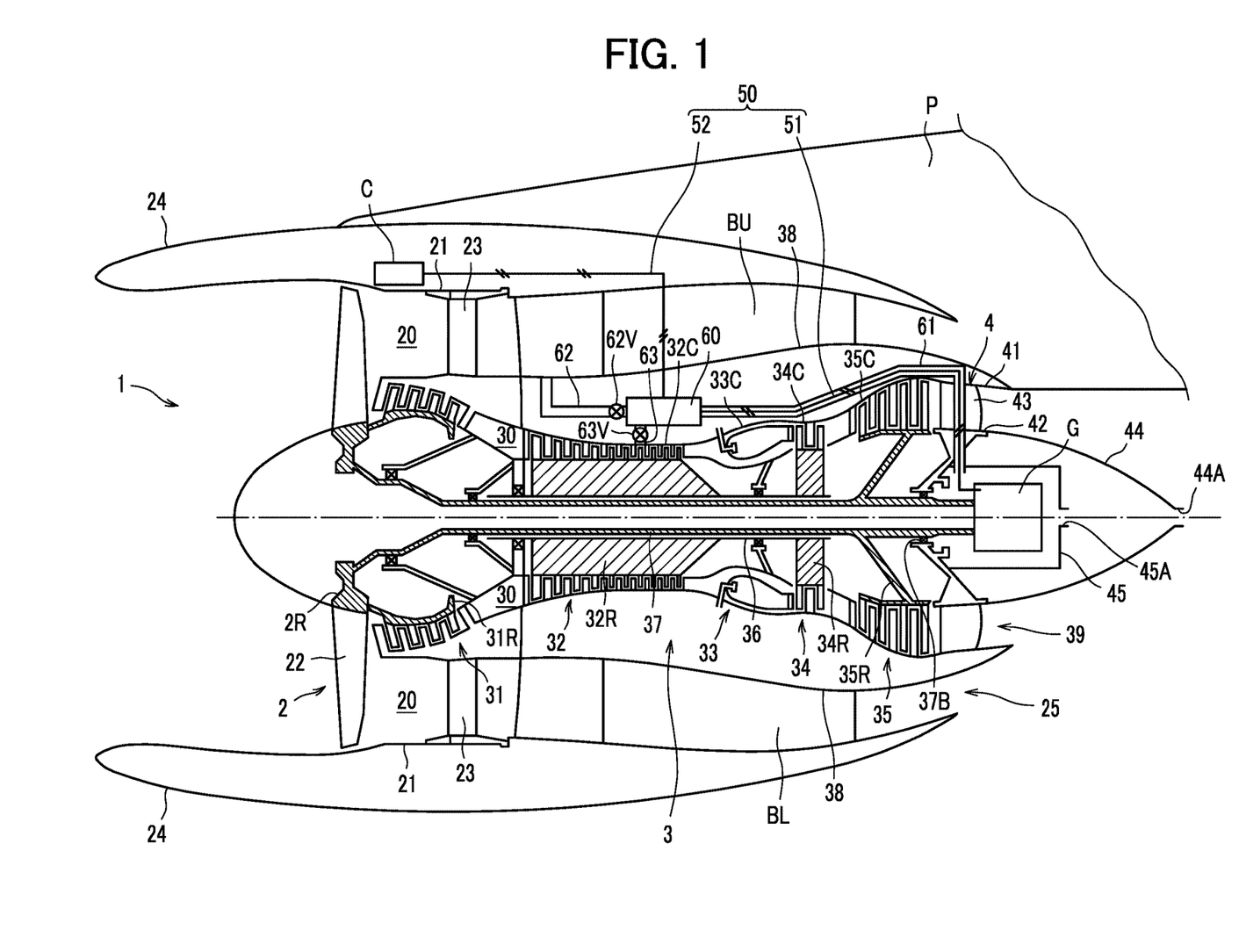
FIG. 1 is a schematic sectional view of a turbo-fan engine that employs a system according to an embodiment of the present disclosure.

FIG. 1 is a schematic sectional view of a turbo-fan engine 1 that employs a system according to an embodiment of the present disclosure.

The turbo-fan engine 1 is composed of a fan 2 disposed at a frontmost portion and a core engine 3 disposed coaxially with the fan 2 behind the fan 2.

The fan 2 incudes a substantially cylindrical fan case 21, a fan rotor (fan disk) 2R rotatably supported inside the fan case 21, a plurality of fan blades (rotor blades) 22 attached at equal intervals to an outer periphery of the fan rotor 2R in a circumferential direction, and a plurality of fan exit guide vanes (stator vanes) 23 attached at equal intervals to a bypass flow path 20, which will be described later, in the circumferential direction.

The fan case 21 is surrounded by a substantially cylindrical nacelle 24, and the nacelle 24 is coupled to a main wing (not illustrated) of an aircraft, which mounts the turbo-fan engine 1, via a pylon P.

The core engine 3 is surrounded by a substantially cylindrical core cowl 38, and the core cowl 38 is coupled to the nacelle 24 via an upper bifurcation BU and a lower bifurcation BL that are hollow pillars with streamlined sections.

In a case of a two-spool turbo-fan engine 1, the core engine 3 includes a low pressure compressor 31, a high pressure compressor 32, a combustor 33, a high pressure turbine 34, and a low pressure turbine 35 in this order from the front portion (upstream) to the rear portion (downstream), a rotor 34R of the high pressure turbine 34 drives and rotates a rotor 32R of the high pressure compressor 32 via a high pressure shaft 36, and a rotor 35R of the low pressure turbine 35 drives and rotates a rotor 2R of the fan 2 and a rotor 31R of the low pressure compressor 31 via a low pressure shaft 37 respectively.

Note that both the high pressure shaft 36 and the low pressure shaft 37 are hollow shafts and the low pressure shaft 37 is disposed inside the high pressure shaft 36.

Also, a turbine exhaust frame 4 that rotatably supports a rear end portion of the low pressure shaft 37 via a bearing 37B is disposed behind the low pressure turbine 35. The turbine exhaust frame 4 includes an annular outer ring 41 on an outer side in a radial direction and an annular inner ring 42 on an inner side in the radial direction, and both the rings are coupled to each other with a plurality of hollow struts (pillars) 43 disposed at equal intervals in the circumferential direction. The outer ring 41 is coupled, at a front end, to a casing 35C of the low pressure turbine 35, and the inner ring 42 supports, at a rear end, a substantially conical-shaped tail cone 44. At least a part of the tail cone 44 defines a boundary of a flow path of a core nozzle 39, which will be described later, in an inner side in the radial direction.

During an operation of the turbo-fan engine 1, a part of air suctioned by the fan blades 22 of the fan 2 and then compressed flows into an annular core flow path 30 of the core engine 3, and a remaining part flows into an annular bypass flow path 20 formed between the nacelle 24 and the core cowl 38.

The air that has flowed into the core flow path 30 is successively compressed by the low pressure compressor 31 and the high pressure compressor 32 and then flows into the combustor 33. Combustion gas generated through combustion of a fuel in the combustor 33 is successively expanded by the high pressure turbine 34 and the low pressure turbine 35 and is then discharged through the core nozzle 39.

A static pressure of the air that has flowed into the bypass flow path 20 is recovered, and swirl velocity components are removed from the air, when the air passing through the fan exit guide vane 23, and the air is discharged through a bypass nozzle 25 and contributes to generation of a most part of a thrust.

In the turbo-fan engine 1 that employs the system according to the embodiment of the present disclosure, a generator G is disposed inside the tail cone 44. More strictly, the generator G is disposed inside a heat shield 45 to block radiant heat inputs from the tail cone 44 heated by the turbine exhaust. Note that a tail cone exhaust hole 44A and a heat shield exhaust hole 45A are provided at rear end portions of the tail cone 44 and the heat shield 45 in order to discharge the cooling air supplied through cooling air ducts 61, which will be described later.

An input shaft of the generator G is coupled to a rear end of the low pressure shaft 37 and is driven and rotated by the low pressure shaft 37. Note that the input shaft of the generator G and the low pressure shaft 37 may be coupled directly to each other or may be coupled to each other via a coupling mechanism.

Also, in the illustrated example, a converter C is disposed at an outer periphery of the fan case 21 inside the nacelle 24, and the generator G and the converter C are connected to each other via electric power cables 50. Note that the generator G is formed to cause a three-phase AC to be generated, and the generator G and the converter C are connected to each other via three electric power cables 50 corresponding to the phases (only one electric power cable 50 is illustrated in the drawing).

The electric power cables 50 include electric power cables 51 extending from the inside of the tail cone 44, in which the generator G is disposed, enter the space inside the core cowl 38 through the inside of the hollow struts 43 of the turbine exhaust frame 4, successively pass through the outer periphery of the casing 35C of the low pressure turbine 35, the outer periphery of a casing 34C of the high pressure turbine 34, and the outer periphery of a casing 33C of the combustor 33, and reach a junction box 60, which will be described later, and electric power cables 52 that enter the space inside the nacelle 24 from the junction box 60 through the inside of the hollow upper bifurcation BU and reach the converter C, although the components are schematically illustrated in FIG. 1.

Since the electric power cables 51 are laid in a hot section (relatively high-temperature portion located at the combustor 33 and further downstream than the combustor 33) of the turbo-fan engine 1, the electric power cables 51 will be referred to as high-temperature part electric power cables 51 below. Also, since the electric power cables 52 are laid in a cold section (relatively low-temperature portion other than the hot section) of the turbo-fan engine 1, the electric power cables 52 will be referred to as low-temperature part electric power cables 52 below.

Since the high-temperature part electric power cables 51 are laid in the hot section of the turbo-fan engine 1 as described above, the high-temperature part electric power cables 51 are heated by heat inputs from the casing 35C of the low pressure turbine 35, the casing 34C of the high pressure turbine 34, and the casing 33c of the combustor 33, and generate a large amount of heat with feeding of a large current, the high-temperature part electric power cables 51 are to be appropriately cooled. Moreover, since the generator G disposed inside the tail cone 44 is also heated to a high temperature due to influences of turbine exhaust passing through the core nozzle 39, the generator G is to be appropriately cooled.

Thus, the system according to the embodiment of the present disclosure is provided with the cooling air ducts 61 to supply the cooling air into the tail cone 44, and the high-temperature part electric power cables 51 are accommodated inside the cooling air ducts 61.

The cooling air ducts 61 reach an outer periphery of the turbine exhaust frame 4 from the junction box 60 disposed at an outer periphery of the casing 32C of the high pressure compressor 32 (cold section) and through an outer periphery of the casing 33C of the combustor 33, an outer periphery of the casing 34C of the high pressure turbine 34, and an outer periphery of the casing 35C of the low pressure turbine 35 in order and reach the inside of the heat shield 45 inside the tail cone 44 through the inside of the hollow struts 43 of the turbine exhaust frame 4.

Meanwhile, a bypass air duct 62 to extract air (fan outlet air or bypass air) from a portion of the bypass flow path 20 on a side further downstream than the fan outlet (more specifically, the trailing edge of the fan exit guide vane 23) and supply the air to the junction box 60 and a core air duct 63 to extract air (core air) from a part of the core flow path 30 on a side further upstream than the outlet of the high pressure compressor 32 and supply the air to the junction box 60 are connected to the junction box 60.

Also, a bypass air ON/OFF valve 62V and a core air ON/OFF valve 63V that can be mutually independently controlled to open and close are disposed at downstream ends (portion on a side immediately upstream the parts of connection to the junction box 60) of the bypass air duct 62 and the core air duct 63, respectively. The ON/OFF valves 62V and 63V (valves) are controlled such that one of the ON/OFF valves 62V and 63V is opened (ON state) while the other is closed (OFF state) in accordance with an operating condition of the turbo-fan engine 1 as will be described later.

The core air duct 63 is connected to an air bleed port (not illustrated) provided at a portion of the casings of the compressors (the low pressure compressor 31 and the high pressure compressor 32) located on a side further upstream than the outlet of the high pressure compressor 32, and the core air is extracted via the air bleed port. The portion at which the air bleed port is provided is a portion at which the core air supplied to the cooling air ducts 61 from the air bleed port through the junction box 60 satisfies the requirements (a pressure and a temperature) to keep the generator G and the high-temperature part electric power cables 51 at or below an acceptable upper limit temperature under the operating condition of the core air ON/OFF valve 63V being opened. Specifically, since the air bleed port is preferably provided on a side further upstream to extract air at a lower temperature while the air bleed port is preferably provided at a side further downstream to extract a larger flow amount of air (against a duct resistance of the core air duct 63 and the cooling air ducts 61), the portion at which the air bleed port is provided is determined on the basis of trade-off between these conditions.

Figure 2:
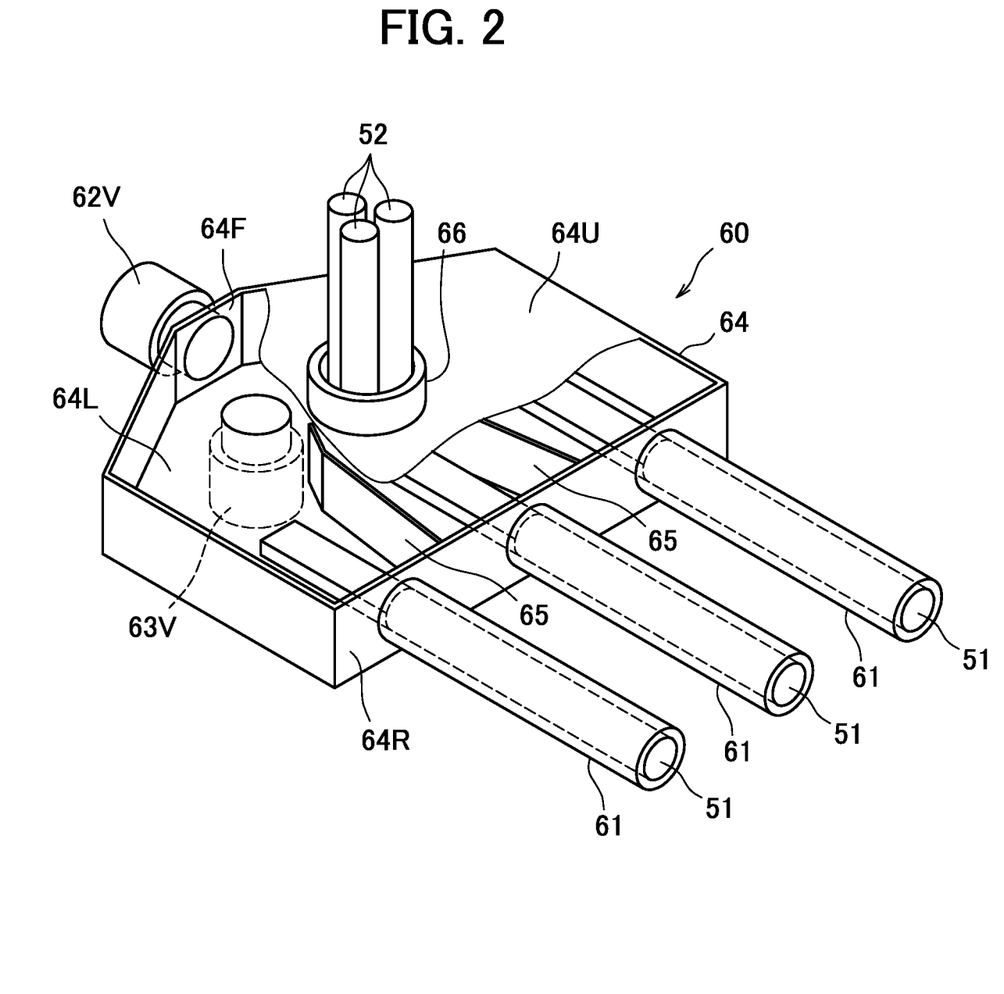
FIG. 2 is a partially broken perspective view illustrating a structure of a junction box in the system according to the embodiment of the present disclosure.

FIG. 2 is a partially broken perspective view illustrating a structure of the junction box 60 in the system according to the embodiment of the present disclosure.

The junction box 60 includes a hollow case body 64 with a combination shape of an isosceles trapezoid (front portion) and a rectangle (rear portion) in a plan view, distribution plates 65 disposed inside the case body 64, and low-temperature part electric power cable guidance ports 66 disposed on an upper wall 64U of the case body 64.

Also, a front wall 64F and a lower wall 64L of the case body 64 are provided with through-holes respectively, and the bypass air ON/OFF valve 62V and the core air ON/OFF valve 63V described above are connected to the through-holes.

In the illustrated example, three through-holes are provided in a rear wall 64R of the case body 64, and three cooling air ducts 61 are connected to the through-holes.

Also, one high-temperature part electric power cable 51 is accommodated inside each cooling air duct 61. The total of three high-temperature part electric power cables 51 are provided to correspond to the phases of the three-phase AC generated by the generator G. Also, the three high-temperature part electric power cables 51 are configured as bus bars obtained by applying insulating coating to bars made of copper to meet the need to supply a large current from the generator G to the converter C.

Three low-temperature part electric power cables 52 are guided from the low-temperature part electric power cable guidance ports 66 disposed on the upper wall 64U of the case body 64 to correspond to the aforementioned three high-temperature part electric power cables 51. The high-temperature part electric power cable 51 and the low-temperature part electric power cable 52 of each phase of the three-phase AC are connected to each other inside the case body 64 of the junction box 60 although not illustrated in the drawing. Note that both the electric power cables may be connected directly to each other or may be connected via a terminal board disposed inside the case body 64.

The bypass air (fan outlet air) or the core air flows into the junction box 60 through either the bypass air ON/OFF valve 62V or the core air ON/OFF valve 63V as will be described later, and two distribution plates 65 are disposed inside the case body 64 in order to uniformly distribute the air that has flowed into the junction box 60 to the three cooling air ducts 61. The distribution plates 65 extend from the rear wall 64R toward the front wall 64F inside the case body 64 and up to the vicinity of the through-hole to which the core air ON/OFF valve 63V is connected.

Figure 3:
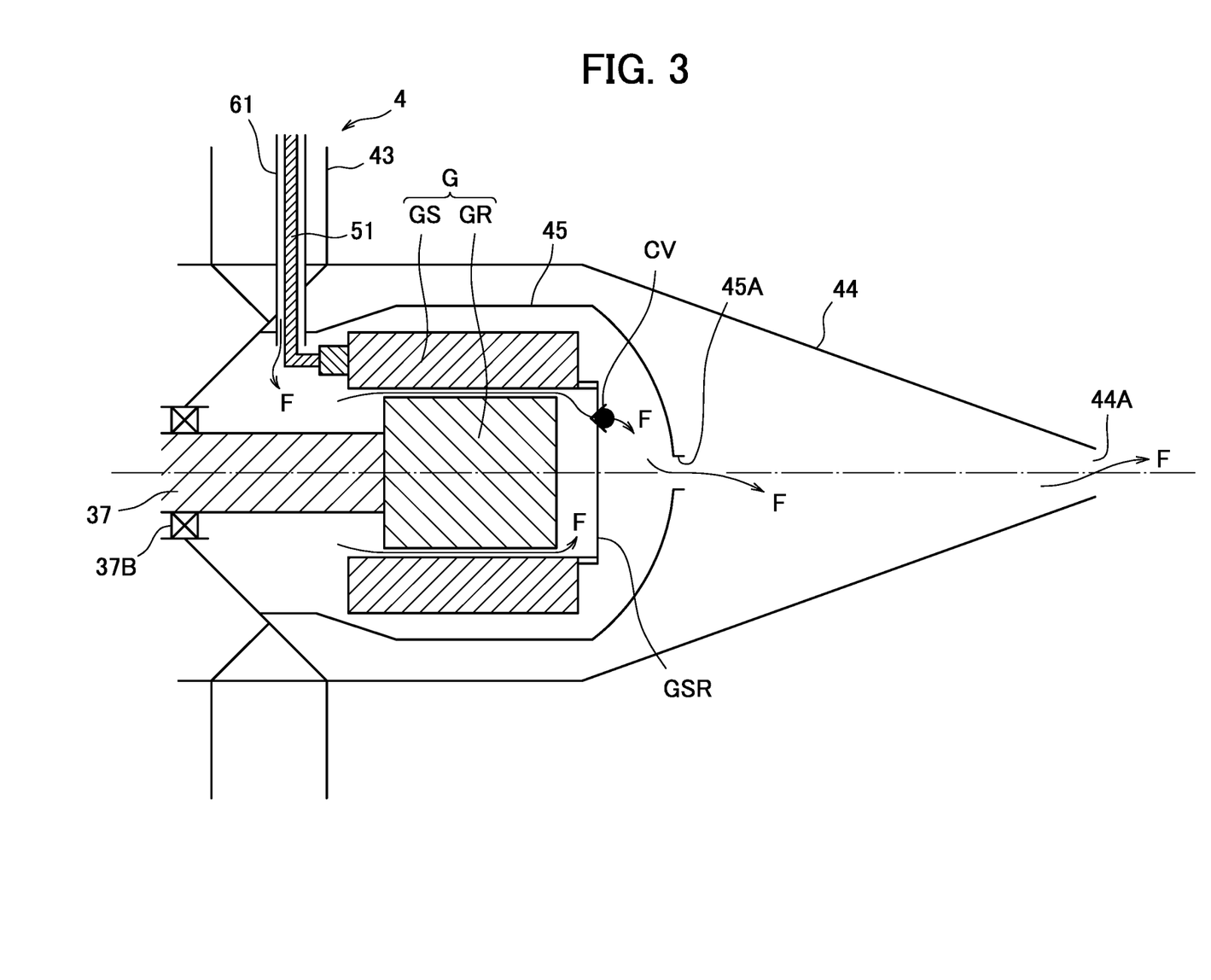
FIG. 3 is a schematic view illustrating a flow of cooling air around a generator in the system according to the embodiment of the present disclosure.

FIG. 3 is a schematic view illustrating a flow of cooling air around the generator in the system according to the embodiment of the present disclosure.

The generator G includes a generator rotor (rotor) GR coupled to the low pressure shaft 37 and a generator stator (stator) GS with a bottomed cylindrical shape disposed to surround the outer periphery of the generator rotor GR, and the aforementioned heat shield 45 surrounds the outer periphery of the generator G.

The front portion of the heat shield 45 is provided with through-holes, and terminals (downstream ends) of the cooling air ducts 61 disposed inside the hollow struts 43 of the turbine exhaust frame 4 are inserted into the through-holes. Also, terminals of the high-temperature part electric power cables 51 accommodated inside the cooling air ducts 61 are connected to a front surface of the generator stator GS inside the heat shield 45. Moreover, a rear wall GSR corresponding to a bottom portion of the generator stator GS with the bottomed cylindrical shape is provided with a through-hole, and a check valve CV is attached to the through-hole.

The cooling air supplied through the cooling air ducts 61 passes through an annular clearance formed between the generator rotor GR and the generator stator GS as represented by the arrow F after flowing into the space inside the heat shield 45 and cools the generator rotor GR and the generator stator GS at that time. Thereafter, the cooling air is discharged to the outside through the check valve CV attached to the rear wall GSR of the generator stator GS, the heat shield exhaust hole 45A, and a tail cone exhaust hole 44A in order. The check valve CV is provided to prevent the cooling air from flowing backward (and further, prevent entrance of turbine exhaust via the tail cone exhaust hole 44A and the heat shield exhaust hole 45A).

Note that although only one cooling air duct 61 (and the high-temperature part electric power cable 51) is illustrated in FIG. 3, three cooling air ducts 61 (and the high-temperature part electric power cables 51) are provided to correspond to the phases of the three-phase AC generated by the generator G as described above. Here, since the dimension of the hollow portions of the struts 43 of the turbine exhaust frame 4 through which the cooling air ducts 61 pass is relatively small in the circumferential direction of the turbo-fan engine 1, in particular, it is typically not possible to cause two or more cooling air ducts 61 to pass through the hollow portions. Therefore, the cooling air ducts 61 (and the high-temperature part electric power cables 51) are disposed inside three continuously adjacent struts 43, for example. In this case, the three cooling air ducts 61 (and the high-temperature part electric power cables 51) that have entered the space inside the core cowl 38 from the space inside the heat shield 45 through the inside of the struts 43 are laid such that the cooling air ducts 61 (and the high-temperature part electric power cables 51) approach and gather with each other in the circumferential direction while passing through the outer periphery of the casing 35C of the low pressure turbine 35, the outer periphery of the casing 34C of the high pressure turbine 34, and the outer periphery of the casing 33C of the combustor 33 in order and then reach the junction box 60.

An operation aspect of the system according to the embodiment of the present disclosure configured as described above will be described below.

Here, a rating of the turbo-fan engine 1 at which the pressure of the fan outlet air (bypass air) reaches a lower limit value for supply of a sufficient flow amount of air to the inside of the tail cone 44 against the duct resistance of the bypass air duct 62 and the cooling air ducts 61 will be referred to as an air bleed switching rating (predetermined lower limit rating).

In a case in which the turbo-fan engine 1 is operated at the air bleed switching rating or a rating higher than the air bleed switching rating, the bypass air ON/OFF valve 62V is opened while the core air ON/OFF valve 63V is closed in the system according to the embodiment of the present disclosure. At this time, only the bypass air flows into the junction box 60 via the bypass air duct 62, and the bypass air is supplied to the inside of the tail cone 44 via the cooling air ducts 61 and cools the high-temperature part electric power cables 51 and the generator G. The bypass air used for the cooling is then discharged to the outside via the check valve CV attached to the rear wall GSR of the generator stator GS, the heat shield exhaust hole 45A, and the tail cone exhaust hole 44A in order as described above.

On the other hand, in a case in which the turbo-fan engine 1 is operated at a rating lower than the air bleed switching rating, the core air ON/OFF valve 63V is opened while the bypass air ON/OFF valve 62V is closed. At this time, only the core air flows into the junction box 60 via the core air duct 63, and the core air is supplied to the inside of the tail cone 44 via the cooling air ducts 61 and cools the high-temperature part electric power cables 51 and the generator G. The bypass air used for the cooling is then discharged to the outside via the check valve CV attached to the rear wall GSR of the generator stator GS, the heat shield exhaust hole 45A, and the tail cone exhaust hole 44A in order as described above. Note that a check valve may be provided at a portion of the bypass air duct 62 on a side further upstream the bypass air ON/OFF valve 62V in order to reliably prevent the core air that has flowed into the junction box 60 via the core air duct 63 from flowing backward through the bypass air duct 62 and flowing out to the bypass flow path 20.

As described above, according to the system in the embodiment of the present disclosure, only the fan outlet air (bypass air) is extracted as air to cool the high-temperature part electric power cables 51 and the generator G and the core air is not extracted in the case in which the turbo-fan engine 1 is operated at a relatively high rating, and it is thus possible to suppress deterioration of engine performance. On the other hand, in a case in which the turbo-fan engine 1 is operated at a relatively low rating, it is not possible to sufficiently cool the high-temperature part electric power cables 51 and the generator G with the fan outlet air (bypass air), and the core air is thus used as air to cool the high-temperature part electric power cables 51 and the generator G. It is thus possible to appropriately cool the high-temperature part electric power cables 51 and the generator G regardless of the rating at which the turbo-fan engine 1 is operated.

Note that the case in which the switching (open/close) of the bypass air ON/OFF valve 62V and the core air ON/OFF valve 63V is performed on the basis of the rating of the turbo-fan engine 1 has been described above, the switching may be performed on the basis of an output signal of a sensor that detects the pressure of the fan outlet air. In this case, the bypass air ON/OFF valve 62V is opened while the core air ON/OFF valve 63V is closed when the pressure of the fan outlet air detected by the sensor is equal to or higher than a predetermined lower limit value. On the other hand, in a case in which the pressure of the fan outlet air detected by the sensor is lower than the predetermined lower limit value, the core air ON/OFF valve 63V is opened while the bypass air ON/OFF valve 62V is closed.

Also, the case in which the three cooling air ducts 61 (and the high-temperature part electric power cables 51) are provided has been described above, the numbers of the ducts and the electric power cables may be arbitrarily determined. Moreover, although the case in which the electric power cables 50 connected to the generator G are connected to the converter C disposed at the outer periphery of the fan case 21 inside the nacelle 24 has been described above, the electric device connected to the generator G via the electric power cables 50 and disposition of the electric device may be arbitrarily determined. However, the electric device is disposed in the cold section of the turbo-fan engine 1 or in the pylon P and a side closer to the aircraft body as compared with the pylon P.

Aspects of the Disclosure

A system according to a first aspect of the present disclosure includes: a junction box; a bypass air duct that supplies, to the junction box, air extracted from a portion of a bypass flow path of the turbo-fan engine on a side further downstream than a fan outlet; a core air duct that supplies, to the junction box, air extracted from a portion of a core flow path of the turbo-fan engine on a side further upstream than a compressor outlet; and a cooling air duct that extends from the junction box to a space in which the generator is accommodated and accommodates the electric power cable inside the cooling air duct, and valves that are able to be independently controlled to open and close are provided at downstream ends of the bypass air duct and the core air duct.

In the system according to a second aspect of the present disclosure, the generator is disposed inside a tail cone supported by a turbine exhaust frame, the junction box is disposed at an outer periphery of a casing of a high pressure compressor, and the cooling air duct passes through an inside of a hollow strut of the turbine exhaust frame on a path from the junction box to the space in which the generator is accommodated.

In the system according to a third aspect of the present disclosure, in a case in which a rating of the turbo-fan engine is equal to or higher than a predetermined lower limit rating, the valve provided at the downstream end of the bypass air duct is opened while the valve provided at the downstream end of the core air duct is closed, and in a case in which the rating of the turbo-fan engine is lower than the predetermined lower limit rating, the valve provided at the downstream end of the core air duct is opened while the valve provided at the downstream end of the bypass air duct is closed.

EXPLANATION OF REFERENCE SIGNS

1 Turbo-fan engine
4 Turbine exhaust frame
20 Bypass flow path
32C Casing of high pressure compressor
43 Strut
44 Tail Cone
50 Electric power cable
51 High-temperature part electric power cable
52 Low-temperature part electric power cable
60 Junction box
61 Cooling air duct
62 Bypass air duct
62V Bypass air ON/OFF valve (valve)
63 Core air duct
63V Core air ON/OFF valve (valve)
G Generator

The invention claimed is:

1. A system for cooling a generator and an electric power cable connected to the generator, the generator and the electric power cable being disposed in a hot section of a turbo-fan engine, the system comprising:
   a junction box;
   a bypass air duct that supplies, to the junction box, air extracted from a portion of a bypass flow path of the turbo-fan engine on a side further downstream than a fan outlet;
   a core air duct that supplies, to the junction box, air extracted from a portion of a core flow path of the turbo-fan engine on a side further upstream than a compressor outlet; and
   a cooling air duct that extends from the junction box to a space in which the generator is accommodated and accommodates the electric power cable inside the cooling air duct,
   wherein valves that are able to be independently controlled to open and close are provided at downstream ends of the bypass air duct and the core air duct.

2. The system according to claim 1,
   wherein the generator is disposed inside a tail cone supported by a turbine exhaust frame,
   the junction box is disposed at an outer periphery of a casing of a high pressure compressor, and
   the cooling air duct passes through an inside of a hollow strut of the turbine exhaust frame on a path from the junction box to the space in which the generator is accommodated.

3. The system according to claim 1,
   wherein in a case in which a rating of the turbo-fan engine is equal to or higher than a predetermined lower limit rating, the valve provided at the downstream end of the bypass air duct is opened while the valve provided at the downstream end of the core air duct is closed, and
   in a case in which the rating of the turbo-fan engine is lower than the predetermined lower limit rating, the valve provided at the downstream end of the core air duct is opened while the valve provided at the downstream end of the bypass air duct is closed.

4. The system according to claim 2,
   wherein in a case in which a rating of the turbo-fan engine is equal to or higher than a predetermined lower limit rating, the valve provided at the downstream end of the bypass air duct is opened while the valve provided at the downstream end of the core air duct is closed, and
   in a case in which the rating of the turbo-fan engine is lower than the predetermined lower limit rating, the valve provided at the downstream end of the core air duct is opened while the valve provided at the downstream end of the bypass air duct is closed.

* * * * *